(12) United States Patent
Tabei

(10) Patent No.: US 7,018,441 B2
(45) Date of Patent: *Mar. 28, 2006

(54) GRANULAR COATED FERTILIZER

(75) Inventor: Nobuaki Tabei, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 359 days.

This patent is subject to a terminal disclaimer.

(21) Appl. No.: 10/201,291

(22) Filed: Jul. 24, 2002

(65) Prior Publication Data

US 2003/0033843 A1 Feb. 20, 2003

(30) Foreign Application Priority Data

Aug. 9, 2001 (JP) .............................. 2001-241896

(51) Int. Cl.
*C05F 9/00* (2006.01)
(52) U.S. Cl. ................................ 71/64.11; 71/27; 71/28
(58) Field of Classification Search ............... 71/64.11, 71/27, 28
See application file for complete search history.

(56) References Cited

U.S. PATENT DOCUMENTS

| | | | | | |
|---|---|---|---|---|---|
| 3,264,089 A | * | 8/1966 | Hansen | ....................... | 71/64.11 |
| 3,475,154 A | * | 10/1969 | Kato | ......................... | 71/64.07 |
| 4,019,890 A | * | 4/1977 | Fujita et al. | ............... | 71/64.11 |
| 5,538,531 A | * | 7/1996 | Hudson et al. | ................ | 71/28 |
| 5,652,196 A | * | 7/1997 | Luthra et al. | ............... | 504/359 |
| 5,851,261 A | * | 12/1998 | Markusch et al. | ......... | 71/64.07 |
| 6,663,686 B1 | * | 12/2003 | Geiger et al. | .................. | 71/28 |

FOREIGN PATENT DOCUMENTS

| | | |
|---|---|---|
| AU | 199930152 A1 | 12/1999 |
| JP | 54-39298 B2 | 11/1979 |
| JP | 2001-163691 A | 6/2001 |

* cited by examiner

*Primary Examiner*—C. Sayala
(74) *Attorney, Agent, or Firm*—Sughrue Mion, PLLC

(57) ABSTRACT

The present invention provides a granular fertilizer which is coated with a thermosetting resin layer (first thermosetting resin layer), a water-insoluble material layer and a thermosetting resin layer (second thermosetting resin layer) from inner to outer layers, and it can release fertilizer ingredients for a long time, by a smaller amount of coating materials than known coated fertilizers.

6 Claims, No Drawings

GRANULAR COATED FERTILIZER

FIELD OF THE INVENTION

The present invention relates to a controlled-release granular coated fertilizer.

BACKGROUND ART

A controlled-release fertilizer, which is also referred to as slow-release fertilizer, can releases a fertilizer ingredient according to a growth of a plant in a designated time and so it is useful for labor-saving. At the present day, various controlled-release fertilizers are suggested and put to practical use, because of ripening of age employed in agriculture, decrease of the number of the employed and increase of side-job farmers.

Japanese Examined Patent Publication No. Sho-54-39298-B describes a controlled-release granular fertilizer, which is coated with an inner layer of wax and outer layer of urethane resin.

However, for obtaining long-term, for example 100–200 days, effective controlled-release fertilizers, plenty of coating materials are needed according to JP Sho-54-39298-B.

The present invention provides a granular coated fertilizer, which can release fertilizer ingredients for a long time, by a smaller amount of coating materials than known coated fertilizers.

SUMMARY OF THE INVENTION

The present fertilizer is a granular fertilizer which is coated with a thermosetting resin layer (first thermosetting resin layer), a water-insoluble material layer and a thermosetting resin layer (second thermosetting resin layer) from inner to outer layers.

DISCLOSURE OF THE INVENTION

The granular fertilizer core used in the present invention may be any conventional granular fertilizer, which contains fertilizer ingredients such as nitrogen, phosphor, potassium, silicon, magnesium, calcium, manganese, boron, iron and so on, for supplying nutrients to cultivating crops. Typical examples thereof include nitrogen fertilizer such as urea, ammonium nitrate, ammonium magnesium nitrate, ammonium chloride, ammonium sulfate, ammonium phosphate, sodium nitrate, calcium nitrate, potassium nitrate, lime nitrogen, urea-form (UF), crotonylidene diurea (CDU), isobutylidene diurea (IBDU), guanylurea (GU); phosphate fertilizer such as calcium superphosphate, conc. superphosphate, fused phosphate, humic acid phosphorus fertilizer, calcined phosphate, calcined conc. phosphate, magnesium superphosphate, ammonium polyphosphate, potassium metaphosphate, calcium metaphosphate, magnesium phosphate, ammonium sulfate phosphate, ammonium potassium nitrate phosphate and ammonium chloride phosphate; potash fertilizer such as potassium chloride, potassium sulfate, potassium sodium sulfate, potassium sulfate magnesia, potassium bicarbonate and potassium phosphate; silicate fertilizer such as calcium silicate; magnesium fertilizer such as magnesium sulfate and magnesium chloride; calcium fertilizer such as calcium oxide, calcium hydroxide and calcium carbonate; manganese fertilizer such as manganese sulfate, manganese sulfate magnesia and manganese slag; boron fertilizer such as boric acid and borates; and iron fertilizer such as slag.

Among them, the fertilizers containing at least one fertilizer ingredient selected from nitrogen (N), phosphor (P) and potassium (K) are preferable, especially the fertilizers containing all these ingredients are more preferable.

Typical examples are NPK type ($N-P_2O_5-K_2O$) fertilizers and they include No.1 type such as 5-5-7 (hereinafter, the numbers mean weight percentages of $N-P_2O_5-K_2O$) and 12-12-16; No.2 type such as 5-5-5 and 14-14-14; No.3 type such as 6-6-5 and 8-8-5; No.4 type such as 4-7-9 and 6-8-11; No.5 type such as 4-7-7 and 10-20-20; No.6 type such as 4-7-4 and 6-9-6; No.7 type such as 6-4-5 and 14-10-13; No.8 type such as 6-5-5 and 18-11-11; No.9 type such as 7-6-5 and 14-12-9; No.10 NP type such as 3-20-0 and 18-35-0; No.11 NK type such as 16-0-12 and 18-0-16; and No.12 PK type such as 0-3-14 and 0-15-15.

A particle diameter of the granular fertilizer core used in the present invention is not specifically limited, but is preferably within a range from 1 to 5 mm in view of manufacturing.

The water-insoluble material used in the present invention should be solid. Its melting point or softening point is usually 40 to 120° C., preferably 50 to 100° C., more preferably 60 to 90° C. It can be waxes, fatty acids, fatty acid salts, fatty acid esters, higher alcohols, silicones and mixtures thereof.

Examples of the wax include insect and animal waxes such as beeswax; vegetable waxes such as candelilla, carnauba, japan wax, ouricury waxes, Douglas-fir bark wax, rice-bran wax, jojoba, castor wax, and bayberry wax; mineral waxes such as montan wax, peat waxes, ozokerite and ceresin waxes, and petroleum waxes (e.g. paraffin wax, microcrystalline wax, semicrystalline wax); and synthetic waxes such as polyethylene wax, Fischer-Tropsch waxes, copolymer waxes of ethylene, propylene and/or acrylic acid, and mixture of petroleum wax with ethylene-vinyl acetate copolymer.

Typical examples of the fatty acid and fatty acid salts are $C_{12-18}$ aliphatic carboxylic acids such as lauric acid, stearic acid and their alkali salts and alkaline earth salts. Further, typical fatty acid esters are glycerin esters of the above-mentioned fatty acids.

Typical examples of the higher alcohol are $C_{16-20}$ alcohols such as cetyl alcohol and stearyl alcohol.

Examples of the silicone include silicone grease and silicone rubber such as polydimethylsiloxane.

The amount of the water-insoluble material layer is usually 0.01 to 1.2 parts, preferably 0.1 to 1.1 parts, more preferably 0.2 to 1.0 part by weight based on 100 parts by weight of the granular fertilizer core. Further, the amount of the water-insoluble material layer to the second thermosetting resin is 0.01:100 to 20:100, preferably 1:100 to 15:100, more preferably 2:100 to 15:100.

Among the water-insoluble materials, petroleum waxes, synthetic waxes and mixtures of petroleum wax with ethylene-vinyl acetate copolymer are preferably used.

The thermosetting resin used in the present invention can be urethane resin, epoxy resin, alkyd resin, unsaturated polyester resin, phenol resin, urea resin, melamine resin, silicone resin and so on. Among them, urethane resin is preferably used. The resin of the first thermosetting resin layer and the resin of the second thermosetting resin layer can be the same or different, but the same resin is usually used.

Urethane resin can be produced by the reaction of polyisocyanate with polyol to make cross-linkage. The polyisocyanate may be a mixture of two or more polyisocyanate compounds. Further, the polyol may be a mixture of two or more polyol compounds. Examples of the polyisocyanate include toluene diisocyanate (TDI), diphenylmethane diisocyanate (MDI), naphthalene diilsocyanate, tolidine diisocyanate, hexamethylene diisocyanate, isophorone diiusocyanate, xylylene diilsocyanate and mixture thereof. Among them, MDI, TDI and the oligomers derived from MDI or TDI (e.g. polymeric MDI, polymeric TDI) are preferably used. Examples of the polyol include polyether polyols prepared by condensation polymerization of aliphatic alcohol (e.g. propylene glycol, trimethylolpropane) with ethylene oxide or propylene oxide using an amino alcohol or amine as an initiator; polytetramethylene ether glycol prepared by polymerization of tetrahydrofuran; polyester polyols obtained by the reaction of a polyether polyol, carboxylic acid and polyhydric alcohol or natural fat or oil having hydroxy groups such as isano oil and caster oil. The NCO/OH equivalent ratio of the used polyisocyanate and polyol is usually in the range of 0.9 to 1.2. The uncured urethane resin in the present invention is a mixture of the polyisocyanate compound, the polyol compound and optionally a curing catalyst, and is obtained by mixing them without any reaction or by previously reacting a portion of them to such a degree that three-dimensional cross-linking does not occur. It is also a useful technique to add a catalyst in order to accelerate the curing reaction. The uncured resin may be in any form of solvent-free type, solution and aqueous emulsion, but is preferably in the form of solvent-free type and being liquid at the processing temperature. Examples of the curing catalyst of the urethane resin include amines such as triethylenediamine, N-methylmorpholine, N,N-dimethylmorphiline, diazabicycloundecene, imidazole, ethylmethylimidazole, diazabicyclooctane and 2,4,6-tris (dimethylaminomethyl)phenol; ammonia derivatives such as urea; alkali compounds such as sodium hydroxide and potassium hydroxide; and organotin compounds such as dibutyltin laurate and dibutyltin maleate. Among them, an amine catalyst is preferably used. These catalysts are used as they are, or in the form of an aqueous solution or suspension. A solid catalyst is preferably used in the form of a ground powder. The amount of the catalyst is usually 0.05 to 5 parts by weight based on 100 parts by weight of the total amount of the polyisocyanate compound and the polyol compound, when the catalyst is used.

Epoxy resin can be produced by the reaction of a phenol or alcohol with epichlorhydrin in the presence of a curing agent, the reaction of a carboxylic acid with epichlorhydrin in the presence of the curing agent, the reaction of an amine, cyanuric acid or hydantoin with epichlorhydrin in the presence of the curing agent or the reaction of an aliphatic cyclic epoxy compound with peracetic acid or the like. Examples of the curing agent include diethylene triamine, triethylene tetramine, m-xylylene diamine, isophorone diamine, 1,3-bisaminomethylcyclohexane, diaminodiphenylmethane, m-phenylene diamine, diaminodiphenyl sulfone, dicyandiamide, organic acid dihydrazides, polyamido-modified polyamines, ketone-modified polyamines, epoxy-modified polyamines, thiourea-modified polyamines, Mannich-modified polyamines, Michael addition-modified polyamines, dodecenylsuccinic anhydride, polyazelaic anhydrides, hexahydrophthalic anhydride, methyltetrahydrophthalic anhydride, methyl Nadic anhydride, trimellitic anhydride, pyromellitic anhydride, benzophenonetetracarboxylic dianhydride, tetrabromophthalic anhydride, HET anhydride (chlorendic anhydride), novolac type polyphenols, polymercaptans, polyisocyanates, polyester resins containing carboxylic acid, benzyldimethylaniline, 2,4,6-trisdimethylaminomethylphenol, 2-methylimidazole, 2-ethyl-4-methylimidazole, 2-heptadecylimidazole, aromatic sulfonium salts, aromatic diazonium salts, resol type phenol resins and urea resins containing methylol group. Typical examples of the epoxy resin include glycidyl ether type epoxy resins such as bisphenol A type, bisphenol F type, brominated bisphenol A type, hydrogenated bisphenol A type, bisphenol S type, bisphenol AF type, biphenyl type, naphthalene type, fluorene type, phenol novolac type, o-cresol novolac type, DPP novolac type, trishydroxyphenylmethane type and tetraphenylolethane type; glycidyl amine type epoxy resins such as tetraglycidyldiaminodiphenylmethane type, triglycidylisocyanurate type, hydantoin type, aminophenol type, aniline type and toluidine type; glycidyl ester type epoxy resins; and alicyclic type epoxy resins.

Alkyd resin can be produced by the reaction of a polybasic acid with a polyhydric alcohol, optionally in the presence of a modifying agent such as vegetable oil and animal fat, metallic soap or skin preventing agent. Examples of the polybasic acid include phthalic anhydride and maleic anhydride, and examples of the polyhydric alcohol include pentaerythritol and glycerin. Examples of the modifying agent include soybean oil, linseed oil, tung oil, safflower oil, coconut oil, palm oil and dehydrogenated castor oil. Examples of the metallic soap include naphthenic acid or octylic acid salts of manganese, cobalt, zirconium, nickel, iron and lead such as zirconium octylate, manganese naphthenate, cobalt octylate and mixtures thereof Examples of skin preventing agent include dipentene, methoxyphenol, cyclohexanone oxime, ethyl methyl ketone oxime and mixtures thereof.

Unsaturated polyester resin can be produced by the reaction of an unsaturated dibasic acid with a divalent alcohol in the presence of vinyl monomer. Examples of the unsaturated dibasic acid include phthalic anhydride, isophthalic acid, terephthalic acid, succinic acid, adipic acid, azelaic acid, sebacic acid, tetrahydrophthalic anhydride, hexahydrophthalic anhydride, tetrabromophthalic anhydride, tetrachlorophthalic anhydride, HET anhydride and endo-methylenetetrahydrophthalic anhydride. Examples of the divalent alcohol include ethylene glycol, propylene glycol, 1,3-butylene glycol, 1,6-hexanediol, diethylene glycol, dipropylene glycol, neopentyl glycol, triethylene glycol, hydrogenated bisphenol A and bisphenol dihydroxypropyl ether. Examples of the vinyl monomer include styrene, vinyltoluene, chlorostyrene, dially phthalate, trially cyanurate and methyl metacrylate.

Phenol resin can be produced by the reaction of a phenol with an aldehyde in the presence of a catalyst such as hydrochloric acid, oxalic acid and hexamethylenetetramine. Examples of the phenol include phenol, o-cresol, m-cresol, p-cresol, xylenol, p-tert-butylphenol and resorcinol. Typical example of the aldehyde is formaldehyde. Novolac type phenol resins are produced in the presence of an acidic catalyst and resol type phenol resins are produced in the presence of a basic catalyst.

Urea resin can be produced by the reaction of urea with formaldehyde in the presence of an alkali catalyst.

Melamine resin can be produced by the reaction of melamine with formaldehyde in the presence of an alkali catalyst.

Silicone resin can be produced by the reaction of a silicone with a polyfunctional siloxane in the presence of a catalyst.

The present fertilizer can be produced by coating a granular fertilizer with a thermosetting resin layer (first thermosetting resin layer), a water-insoluble material layer, and then a thermosetting resin layer (second thermosetting resin layer) from inner to outer layers.

The first step forming the first thermosetting resin layer can be carried out by keeping the granular fertilizer in a tumbled state; adding the uncured thermosetting resin to the granular fertilizer coated with the first water-insoluble material layer; placing the granular fertilizer in a tumbled state for coating; and curing thermally. The amount of the first thermosetting resin is usually 1 to 10 parts by weight, preferably 2 to 8 parts by weight, based on 100 parts by weight of the granular fertilizer core. The first step may be performed by the addition of the uncured thermosetting resin, coating and curing once, but the coating of the thermosetting resin can be preferably performed little by little several times. Namely, the amount of the uncured thermosetting resin added once is adjusted an amount that can form 1 to 10 µm, preferably 2 to 6 µm, of the thermosetting resin layer in thickness. And then the procedures of the addition of the uncured thermosetting resin, coating and curing are performed several times for forming a desired thickness. Especially, this method is preferable for obtaining a uniform coating in industrial scale. In the first step, the curing is not necessarily complete curing. It is enough to make the uncured thermosetting resin lose spinnability at the temperature of the gelation point or more. Then, as it can be avoidable that the granules agglomerate to make it difficult to crack the aggregation, the next step can follow it. The addition of the uncured thermosetting resin can be performed by dropping, spraying or the like. The temperature for curing to form the first thermosetting resin layer is usually a temperature that makes the gel time 5 minutes or less, preferably 3 minutes or less. The catalyst may make the temperature for curing lower. The catalyst can be added to the uncured thermosetting resin, or added to the tumbling granules after the addition of the uncured thermosetting resin.

The second step forming the water-insoluble material layer can be carried out by adding the water-insoluble material to the granules obtained by the first step in a tumbled state at the temperature of the melting point or softening point of the water-insoluble material or more; and keeping the granules in a tumbled state at the temperature of the melting point or softening point of the water-insoluble material or more for coating uniformly. The second step can also be carried out by keeping the granules in a tumbled state at the temperature of the melting point or softening point of the water-insoluble material or more; spraying the melted water-insoluble material from a spray-nozzle; and placing the granules in a tumbled state for coating uniformly.

The third step forming the second thermosetting resin layer can be carried out by the same procedure as the first step. Further, the third step may comprise a process of keeping the granules coated with the second thermosetting resin layer in the tumbled state at the necessary temperature for complete curing. The first thermosetting resin and the second thermosetting resin can be the same or different, but the same thermosetting resin is usually used. The amount of the second thermosetting resin is usually 4 to 14 parts by weight based on 100 parts by weight of the granular fertilizer core. The total amount of the first thermosetting resin and the second thermosetting resin is usually 6 to 16 parts by weight based on 100 parts by weight of the granular fertilizer core.

The above-mentioned three steps are usually performed continuously. In a method of placing the granules into the tumbling state, an apparatus is not specifically limited and a known conventional apparatus can be used and examples thereof include rotary pan, rotary drum and the like. An apparatus with a heating-equipment is suitable for realization of high accuracy of coating and adjustment of a processing time.

Though the granular coated fertilizer of the present invention has three coating layers, each of the water-insoluble material layer and the thermosetting resin layers is not necessarily pure. As the present granular coated fertilizer is usually produced by the above-mentioned steps, a partial interchange of the materials may occur between the adjacent layers. As a result, the water-insoluble material layers may contain some thermosetting resin and the thermosetting resin layers may contain some water-insoluble materials in an amount given by the partial interchange caused by the above-mentioned steps.

Further, inorganic powders may be held on the surface of the second thermosetting resin layer for preventing agglomeration. Examples of the inorganic powders include talc, clay, bentonite, diatomaceous earth, silica, carbon black, calcium carbonate, iron oxide and activated carbon.

The granular coated fertilizer of the present invention is controlled-release fertilizer effective for a long time. Further, it is economical since it can be produced with a smaller amount of the coating materials.

EXAMPLES

The following examples illustrate the present invention in further detail but are not to be construed to limit the scope thereof.

The evaluation of the fertilizer dissolution was conducted by the method below.

Namely, 7.5 g of a test sample is charged in a bottle and 100 ml of water is added thereto. After maintaining the bottle at 25° C. for designated days, the concentration of the fertilizer ingredient is traced by observing the conductivity of the water with a conductivity measuring instrument. As a result, dissolution amount of the fertilizer ingredient from the coated granules is measured and the dissolution behavior is observed.

Example 1

(1) In a temperature-controllable concrete mixer equipped with a hot-air generator, 5 kg of granular fertilizer (NPK 16-16-16 chemical fertilizer produced by Sumitomo Chemical Co., average particle diameter: 2.8 mm) was charged and placed into a tumbling state by rotating at 20–30 rpm. The temperature of the charged granular fertilizer is maintained at 70° C. by heating the mixer, thereby to maintain the tumbling state. A liquid uncured urethane resin, which was prepared by mixing 11.8 g of Polymeric MDI (commercial name: Sumidur 44V10, produced by Sumika Bayer Urethane Co., NCO group: 31%) and 13.1 g of branched polyether type polyol (commercial name: Sumiphen TM, produced by Sumika Bayer Urethane Co., hydroxylated ratio: 372 mgKOH/g) as a coating resin and 0.3 g of 2,4,6-tris (dimethylaminomethyl) phenol as an amine catalyst with stirring, was quickly added thereto at a tumbling state. The amount of the used urethane resin was 0.5 part by weight based on 100 parts by weight of the granular fertilizer core, and the thickness of the urethane resin layer was about 2.9 µm (calculated value). It was confirmed by a visual observation that the surface of the granular fertilizer is coated with the charged resin, almost uniformly, over about 30 seconds. Three minutes after charging the resin, a portion of the sample was taken out. As a result of observing the portion, the resin was in a state of being free from adhesion. The above procedure (the addition of the uncured urethane resin) was repeated 3 times every three minutes to coat the fertilizer with the resin in the amount of 2 parts by weight based on 100 parts by weight of the granular fertilizer core.

(2) Then, 30 g of microcrystalline wax Hi-Mic-1045 (produced by Nippon Seiro Co., mp 70° C.) were added thereto all at once at 72° C., and maintained the tumbling state for 10 minutes at the same temperature to coat the granular fertilizer with the wax. The amount of the water-insoluble material (wax) layer was 0.6 part by weight based on 100 parts by weight of the granular fertilizer core.

(3) Further, the coating step of the urethane resin was performed 16 times according to (1). The amount of the urethane resin was 8 parts by weight based on 100 parts by weight of the granular fertilizer core. Finally, the granular fertilizer was maintained at 75° C. for 3 minutes to completely cure the resin, thereby obtaining an objective coated granular fertilizer.

(4) The coated granular fertilizer obtained above was provided to evaluate the dissolution of the fertilizer ingredient in water at 25° C. The results are given in Table 3.

Examples 2 and 3

In the same operation as in Example 1 (1)–(3) except for changing the amount of the used urethane resin to the amount described in Table 1, coated granular fertilizers were obtained. The dissolution of the fertilizer ingredient was evaluated in the same operation as in Example 1 (4). The results are given in Table 3.

Reference Example 1

(1) In a temperature-controllable concrete mixer equipped with a hot-air generator, 5 kg of granular fertilizer (NPK 16-16-16 chemical fertilizer produced by Sumitomo Chemical Co., average particle diameter: 2.8 mm) was charged and placed into a tumbling state by rotating at 20–30 rpm. The temperature of the charged granular fertilizer is maintained at 70° C. by heating the mixer, thereby to maintain the tumbling state. Thirty grams (30 g) of microcrystalline wax Hi-Mic-1045 (produced by Nippon Seiro Co., mp 70° C.) were added thereto all at once, and maintained the tumbling state for 10 minutes at the same temperature to coat the granular fertilizer with the wax. The amount of the first water-insoluble material (wax) layer was 0.6 part by weight based on 100 parts by weight of the granular fertilizer core.

(2) Then, an uncured urethane resin composition consisting of 11.8 g of Polymeric MDI (Sumidur 44V10) and 13.1 g of a branched polyether type polyol (Sumiphen TM) as a coating resin and 0.3 g of 2,4,6-tris (dimethylaminomethyl)phenol as an amine catalyst was quickly added to the tumbling granular fertilizer obtained in (1) at 70° C. The above step was repeated 19 times every three minutes to coat the fertilizer with the resin in the amount of 10 parts by weight based on 100 parts by weight of the granular fertilizer core. Further, the granular fertilizer was maintained at 75° C. for 3 minutes to completely cure the resin, thereby obtaining an objective coated granular fertilizer.

(3) The coated granular fertilizer obtained above was provided to evaluate the dissolution of the fertilizer ingredient by the same procedure as Example 1 (4). The results are given in Table 3.

Reference Examples 2 and 3

In the same operation as in Reference Example 1 (1)–(2) except for changing the amount of the used urethane resin to the amount described in Table 1, coated granular fertilizers were obtained. The dissolution of the fertilizer ingredient was evaluated in the same operation as in Example 1 (4). The results are given in Table 3.

Reference Examples 4–6

In the same operation as in Reference examples 1, 2 and 3 except for not performing the step of Reference example 1 (1), coated granular fertilizers were obtained. The dissolution of the fertilizer ingredient was evaluated in the same operation as in Example 1 (4). The results are given in Table 3.

Example 4

(1) In a temperature-controllable concrete mixer equipped with a hot-air generator, 5 kg of granular fertilizer (granular calcium-ammonium nitrate produced by Kemira, average particle diameter: 2.8 mm) was charged and placed into a tumbling state by rotating at 20–30 rpm. The temperature of the charged granular fertilizer is maintained at 68° C. by heating the mixer, thereby to maintain the tumbling state. A liquid uncured urethane resin, which was prepared by mixing 11.8 g of Polymeric MDI (commercial name: Sumidur 44V10, produced by Sumika Bayer Urethane Co., NCO group: 31%) and 13.1 g of branched polyether type polyol (commercial name: Sumiphen TM, produced by Sumika Bayer Urethane Co., hydroxylated ratio: 372 mgKOH/g) as a coating resin and 0.2 g of 50% aqueous urea as a catalyst were mixed with stirring to give a liquid uncured urethane resin, which was quickly added thereto at a tumbling state at 68° C. The amount of the used urethane resin was 0.5 part by weight based on 100 parts by weight of the granular fertilizer core, and the thickness of the urethane resin layer was about 2.9 μm (calculated value). It was confirmed by a visual observation that the surface of the granular fertilizer is coated with the charged resin, almost uniformly, over about 30 seconds. Three minutes after charging the resin, a portion of the sample was taken out. As a result of observing the portion, the resin was in a state of being free from adhesion. The above procedure (the addition of the uncured urethane resin) was repeated 3 times every three minutes to coat the fertilizer with the resin in the amount of 2 parts by weight based on 100 parts by weight of the granular fertilizer core.

(2) Then, 30 g of paraffin wax PALVAX 1430 containing ethylene-vinyl acetate copolymer (produced by Nippon Seiro Co., mp 63° C.) were added thereto all at once at 70° C., and maintained the tumbling state for 10 minutes at the same temperature to coat the granular fertilizer with the wax. The amount of the water-insoluble material (wax) layer was 0.6 part by weight based on 100 parts by weight of the granular fertilizer core.

(3) Further, the coating step of the urethane resin was performed 16 times according to (1). The amount of the urethane resin was 8 parts by weight based on 100 parts by weight of the granular fertilizer core. Finally, the granular fertilizer was maintained at 73° C. for 3 minutes to completely cure the resin, thereby obtaining an objective coated granular fertilizer.

The coated granular fertilizer obtained above was provided to evaluate the dissolution of the fertilizer ingredient in the same operation as in Example 1 (4). The results are given in Table 4.

Examples 5 and 6

In the same operation as in Example 4 (1)–(3) except for changing the amount of the used urethane resin to the amount described in Table 2, coated granular fertilizers were obtained. The coated granular fertilizer obtained above was provided to evaluate the dissolution of the fertilizer ingredient in the same operation as in Example 1 (4). The results are given in Table 4.

Reference Example 7

(1) In a temperature-controllable concrete mixer equipped with a hot-air generator, 5 kg of granular fertilizer (granular calcium-ammonium nitrate produced by Kemira, average particle diameter: 2.8 mm) was charged and placed into a tumbling state by rotating at 20–30 rpm. The temperature of the charged granular fertilizer is maintained at 68° C. by heating the mixer, thereby to maintain the tumbling state. Thirty grams (30 g) of paraffin wax PALVAX 1430 containing ethylene-vinyl acetate copolymer were added thereto all at once, and maintained the tumbling state for 10 minutes at the same temperature to coat the granular fertilizer with the wax. The amount of the first water-insoluble material (wax) layer was 0.6 part by weight based on 100 parts by weight of the granular fertilizer core.

(2) Then, 11.8 g of Polymeric MDI (Sumidur 44V10) and 13.1 g of a branched polyether type polyol (Sumiphen TM) as a coating resin and 0.2 g of 50% aqueous urea as a catalyst were mixed with stirring to give a liquid uncured urethane resin, which was quickly added to the tumbling granular fertilizer obtained in (1) at 68° C. The above step was repeated 19 times every three minutes to coat the fertilizer with the resin in the amount of 10 parts by weight based on 100 parts by weight of the granular fertilizer core. Further, the granular fertilizer was maintained at 74° C. for 3 minutes to completely cure the resin, thereby obtaining an objective coated granular fertilizer.

(3) The coated granular fertilizer obtained above was provided to evaluate the dissolution of the fertilizer ingredient by the same procedure as Example 1 (4). The results are given in Table 4.

Reference Examples 8 and 9

In the same operation as in Reference example 7 (1)–(2) except for changing the amount of the used urethane resin to the amount described in Table 2, coated granular fertilizers were obtained. The dissolution of the fertilizer ingredient was evaluated in the same operation as in Example 1 (4). The results are given in Table 4.

Reference Examples 10–12

In the same operation as in Reference examples 7, 8 and 9 except for not performing the step of Reference example 7 (1), coated granular fertilizers were obtained. The dissolution of the fertilizer ingredient was evaluated in the same operation as in Example 1 (4). The results are given in Table 4.

TABLE 1

|  | Amount of First urethane resin layer | Amount of water-insoluble material layer | Amount of Second urethane resin layer | Total amount of water-insoluble material | Total amount of urethane resin |
|---|---|---|---|---|---|
| Example 1 | 2 | 0.6 | 8 | 0.6 | 10 |
| Example 2 |  |  | 6 |  | 8 |
| Example 3 |  |  | 4 |  | 6 |
| Reference example 1 | 0 | 0.6 | 10 |  | 10 |
| Reference example 2 |  |  | 8 |  | 8 |
| Reference example 3 |  |  | 6 |  | 6 |
| Reference example 4 | 0 | 0 | 10 | 0 | 10 |
| Reference example 5 |  |  | 8 |  | 8 |
| Reference example 6 |  |  | 6 |  | 6 |

Each amount is part by weight based on 100 parts by weight of the granular fertilizer core.

TABLE 2

|  | Amount of First urethane resin layer | Amount of water-insoluble material layer | Amount of Second urethane resin layer | Total amount of water-insoluble material | Total amount of urethane resin |
|---|---|---|---|---|---|
| Example 4 | 2 | 0.6 | 8 | 0.6 | 10 |
| Example 5 |  |  | 6 |  | 8 |
| Example 6 |  |  | 4 |  | 6 |
| Reference example 7 | 0 | 0.6 | 10 |  | 10 |
| Reference example 8 |  |  | 8 |  | 8 |
| Reference example 9 |  |  | 6 |  | 6 |
| Reference example 10 | 0 | 0 | 10 | 0 | 10 |
| Reference example 11 |  |  | 8 |  | 8 |
| Reference example 12 |  |  | 6 |  | 6 |

Each amount is part by weight based on 100 parts by weight of the granular fertilizer core.

TABLE 3

| | Dissolution rate (%) | | | | | | | | | |
|---|---|---|---|---|---|---|---|---|---|---|
| | 10 days | 20 days | 30 days | 40 days | 50 days | 60 days | 70 days | 80 days | 90 days | 100 days |
| Example 1 | 1 | 2 | 4 | 5 | 6 | 9 | 13 | 16 | 21 | 27 |
| Example 2 | 1 | 3 | 6 | 10 | 15 | 20 | 25 | 30 | 35 | 40 |
| Example 3 | 3 | 6 | 10 | 15 | 19 | 25 | 29 | 33 | 38 | 44 |
| Reference example 1 | 1 | 9 | 17 | 28 | 36 | 45 | 51 | 57 | 63 | 66 |
| Reference example 2 | 7 | 16 | 25 | 35 | 44 | 51 | 58 | 64 | 68 | 71 |
| Reference example 3 | 9 | 26 | 37 | 47 | 55 | 62 | 67 | 71 | 75 | 77 |
| Reference example 4 | 1 | 10 | 21 | 31 | 40 | 48 | 54 | 59 | 63 | 67 |
| Reference example 5 | 2 | 13 | 26 | 38 | 46 | 53 | 60 | 65 | 68 | 71 |
| Reference example 6 | 11 | 25 | 38 | 49 | 59 | 66 | 72 | 76 | 78 | 80 |

TABLE 4

| | Dissolution rate (%) | | | | | | | | | |
|---|---|---|---|---|---|---|---|---|---|---|
| | 10 days | 20 days | 30 days | 40 days | 50 days | 60 days | 70 days | 80 days | 90 days | 100 days |
| Example 4 | 0 | 1 | 1 | 2 | 3 | 6 | 9 | 13 | 17 | 20 |
| Example 5 | 0 | 2 | 3 | 6 | 9 | 13 | 17 | 21 | 25 | 29 |
| Example 6 | 0 | 2 | 4 | 7 | 12 | 18 | 24 | 29 | 33 | 38 |
| Reference example 7 | 11 | 21 | 32 | 42 | 53 | 62 | 69 | 75 | 80 | |
| Reference example 8 | 20 | 34 | 45 | 55 | 62 | 72 | 78 | 82 | | |
| Reference example 9 | 40 | 53 | 66 | 76 | 83 | | | | | |
| Reference example 10 | 11 | 22 | 34 | 45 | 56 | 64 | 71 | 78 | 84 | |
| Reference example 11 | 26 | 40 | 51 | 62 | 69 | 76 | 82 | | | |
| Reference example 12 | 46 | 60 | 72 | 82 | | | | | | |

What is claimed is:

1. A granular fertilizer which is coated with a thermosetting resin layer (first thermosetting resin layer), a water-insoluble material layer and a thermosetting resin layer (second thermosetting resin layer) from inner to outer layers.

2. A granular coated fertilizer according to claim 1, wherein at least one of the first thermosetting resin and the second thermosetting resin is urethane resin.

3. A granular coated fertilizer according to claim 1, wherein both of the first thermosetting resin and the second thermosetting resin are urethane resin.

4. A granular coated fertilizer according to claim 1, wherein the water-insoluble material is at least one selected from the group of waxes, fatty acids, fatty acid salts, fatty acid esters, higher alcohols, silicones and mixtures thereof.

5. A granular coated fertilizer according to claim 1, wherein the water-insoluble material is at least one selected from the group of petroleum waxes, synthetic waxes and mixtures of petroleum wax with ethylene-vinyl acetate copolymer.

6. A granular coated fertilizer according to claim 1, wherein the amounts of the first thermosetting resin, the second thermosetting resin, the water-insoluble material are 1 to 10, 4 to 14 and 0.01 to 1.2 parts by weight respectively based on 100 parts by weight of the granular fertilizer.

* * * * *